Figure 1:
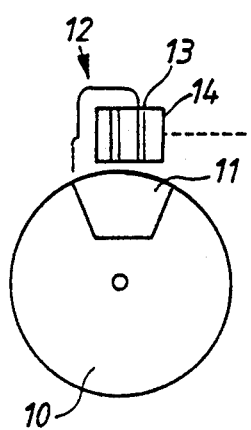

United States Patent [19]

Andreasson

[11] Patent Number: 5,263,451
[45] Date of Patent: Nov. 23, 1993

[54] METHOD OF CONTROLLING THE OPERATION OF AN I. C. ENGINE

[75] Inventor: Bo C. Andreasson, Kungälv, Sweden

[73] Assignee: Aktiebolaget Electrolux, Sweden

[21] Appl. No.: 943,292

[22] Filed: Sep. 10, 1992

[30] Foreign Application Priority Data

Sep. 11, 1991 [SE] Sweden ................... 9102630

[51] Int. Cl.$^5$ ............................................ F02D 43/02
[52] U.S. Cl. ..................... 123/425; 123/435; 324/399
[58] Field of Search .................. 123/425, 435, 630; 324/399

[56] References Cited

U.S. PATENT DOCUMENTS

| | | | |
|---|---|---|---|
| 4,117,807 | 10/1978 | Barnard | 123/630 |
| 4,417,556 | 11/1983 | Latsch | 123/425 |
| 5,143,042 | 9/1992 | Scheid | 123/630 |

FOREIGN PATENT DOCUMENTS

| | | | |
|---|---|---|---|
| 0056841 | 10/1981 | European Pat. Off. | 123/425 |
| 0400172 | 5/1989 | European Pat. Off. | |
| 58-25579 | 2/1983 | Japan | 123/425 |
| 3-81568 | 4/1991 | Japan | 123/630 |

*Primary Examiner*—Andrew M. Dolinar
*Attorney, Agent, or Firm*—Pearne, Gordon, McCoy & Granger

[57] ABSTRACT

In a method of controlling the point of ignition and/or air-fuel mixture of an i. c. engine, a signal circuit is used for emitting a signal indicating abnormal combustion or disturbance, and the first derivative of the spark current is used for the detection. According to the invention, the average peak value of the first derivative of the spark current is a reference value of the detection, and the actual signal of the derivative of the spark current is compared via a voltage divider and a comparator circuit with said average peak value, whereby detection is obtained when the signal from the voltage divider exceeds said average peak value.

2 Claims, 3 Drawing Sheets

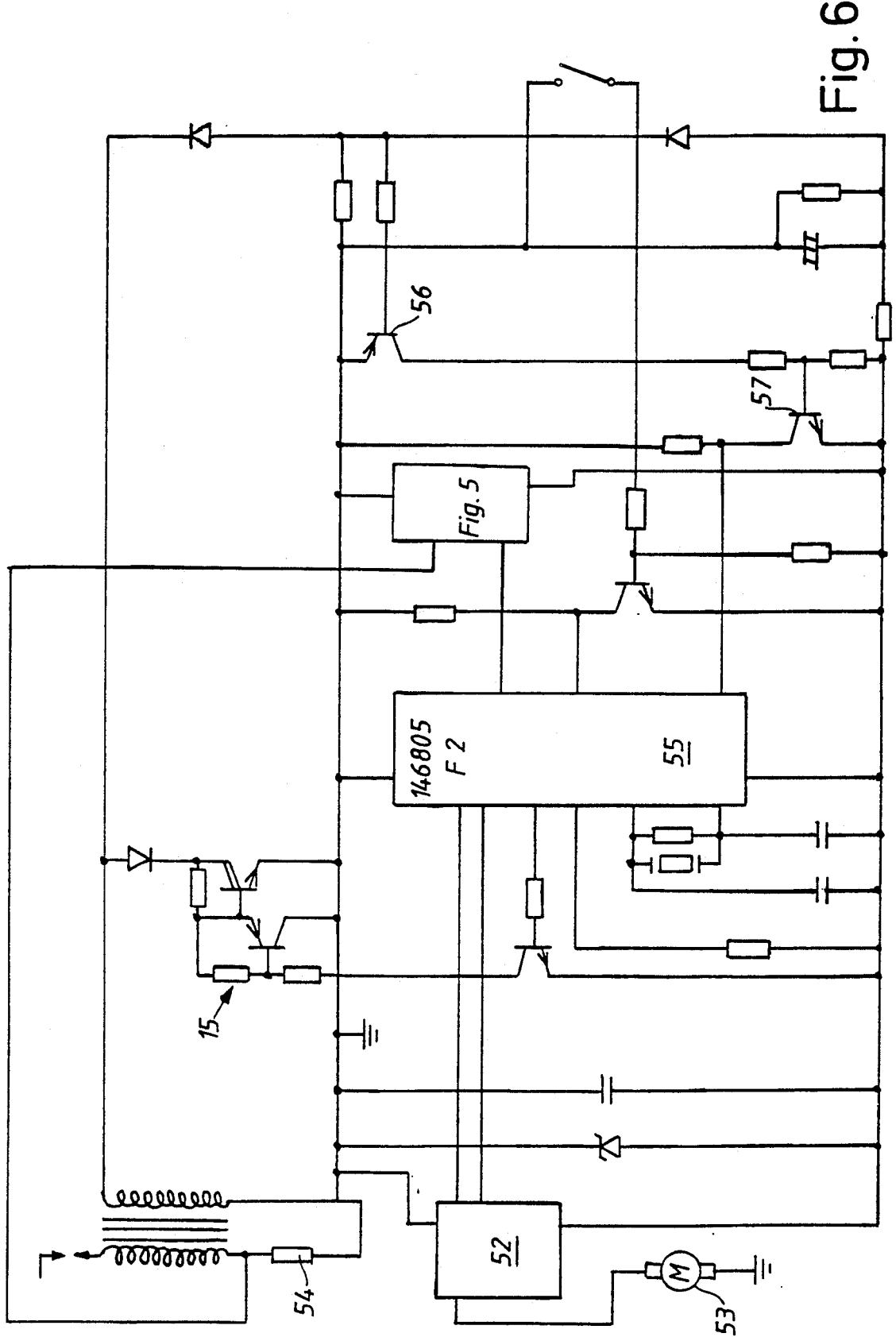

METHOD OF CONTROLLING THE OPERATION OF AN I. C. ENGINE

The present invention relates to a method of controlling the point of ignition and/or air-fuel mixture of an i. c. engine by means of a signal circuit emitting a signal indicating abnormal combustion or disturbance, by using the first derivative of the spark current for detection. The invention generally relates to small i. c. engines such as used in chain saws and having a carburetor adjusted to an optimal lean mixture in order to keep the exhaust gas emissions, preferably HC and CO, at a low level.

I. c. engines produce undesirable exhaust gases the composition of which is influenced by the air-fuel ratio (A/F) of the engine. According to the technique used at present for adjusting the carburetor, the operator adjusts the carburetor at full gas to obtain a recommended maximum speed of rotation. Due to the instability of membrane carburetors used at present such adjustment must be carried out a plurality of times daily. To meet new demands of exhaust gas emissions this technique is unsatisfactory since it does not ensure in any way that the contents of HC and CO are kept within prescribed limits. New technique is therefore nessary. In products such as chain saws, lawn mowers, clearing saws, etc. the cost of manufacturing is very essential due to the low price of the products. In products of this type a magnetic ignition system without a generator is normally used.

The present invention enables the use of a simple and cheap spark detector and to combine the calibration electronics with the electronics of the ignition system in order to minimize cost. By using a portion of the energy of the ignition magnet for feeding current to the electronic equipment no extra generator or battery is necessary.

The spark detector is primarily intended to be used as a complement to other control equipment for the fuel and/or ignition systems of the engine. For example, the spark detector can detect so-called knocking when the engine is running on lean mixture. Engine breakdown can thereby be prevented by using the information from the spark detector for adjusting the point of ignition and/or the air-fuel ratio of the engine. However, the spark detector can also be used as a sole detector for controlling the air-fuel mixture.

The complete system comprises:
  Spark detector, combined with an electronic unit for the ignition system and the control.
  Electronic unit for detecting and control.
  Control means in the carburetor (fuel system) controlled by the electronic equipment and enabling control of the amount of fuel.
  Magnetic ignition system in which the current pulse induced by the magnet is used as current supply and sensor of speed of rotation.
  Full gas sensor (optional).

The method according to the invention, applied to an engine having the described functions, is generally characterized in that the average peak value of the first derivative of the spark current is a reference value of the detection, and that the actual signal of the derivative of the spark current via a voltage divider is compared in a comparator circuit with said average peak value, whereby detection is obtained when the signal from the voltage divider exceeds said average peak value.

Figure 2:
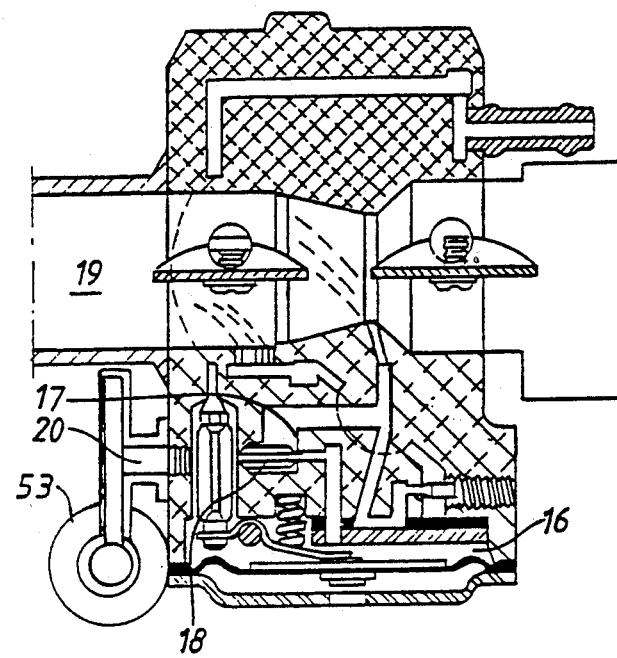
Figure 3:
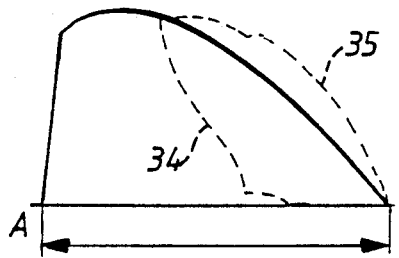
Figure 4:
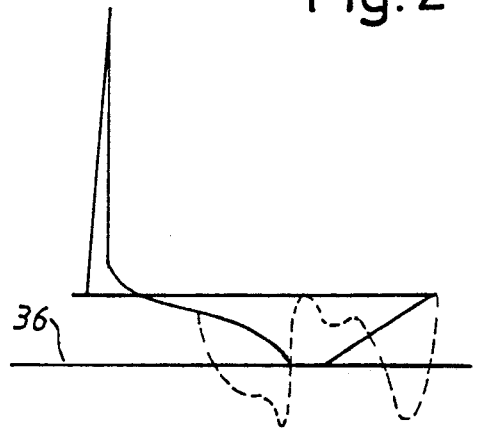
Figure 7:
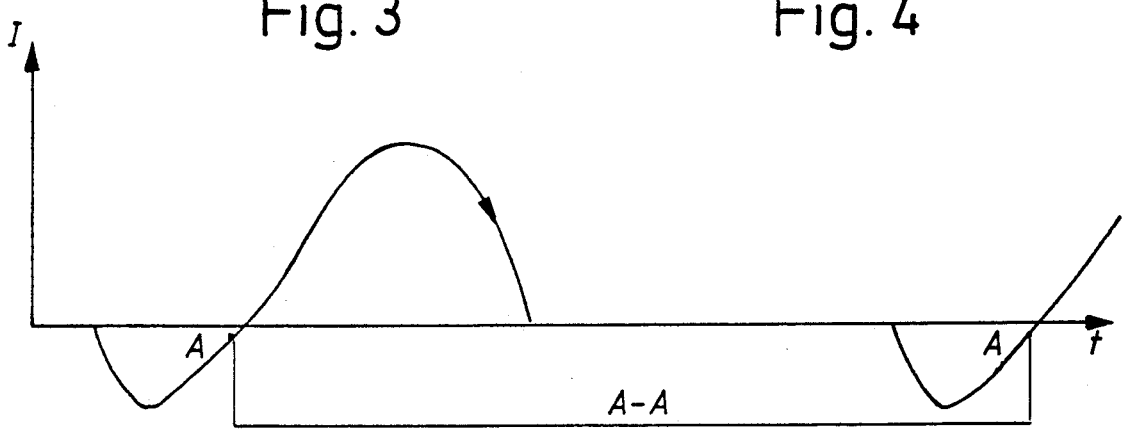
Figure 5:
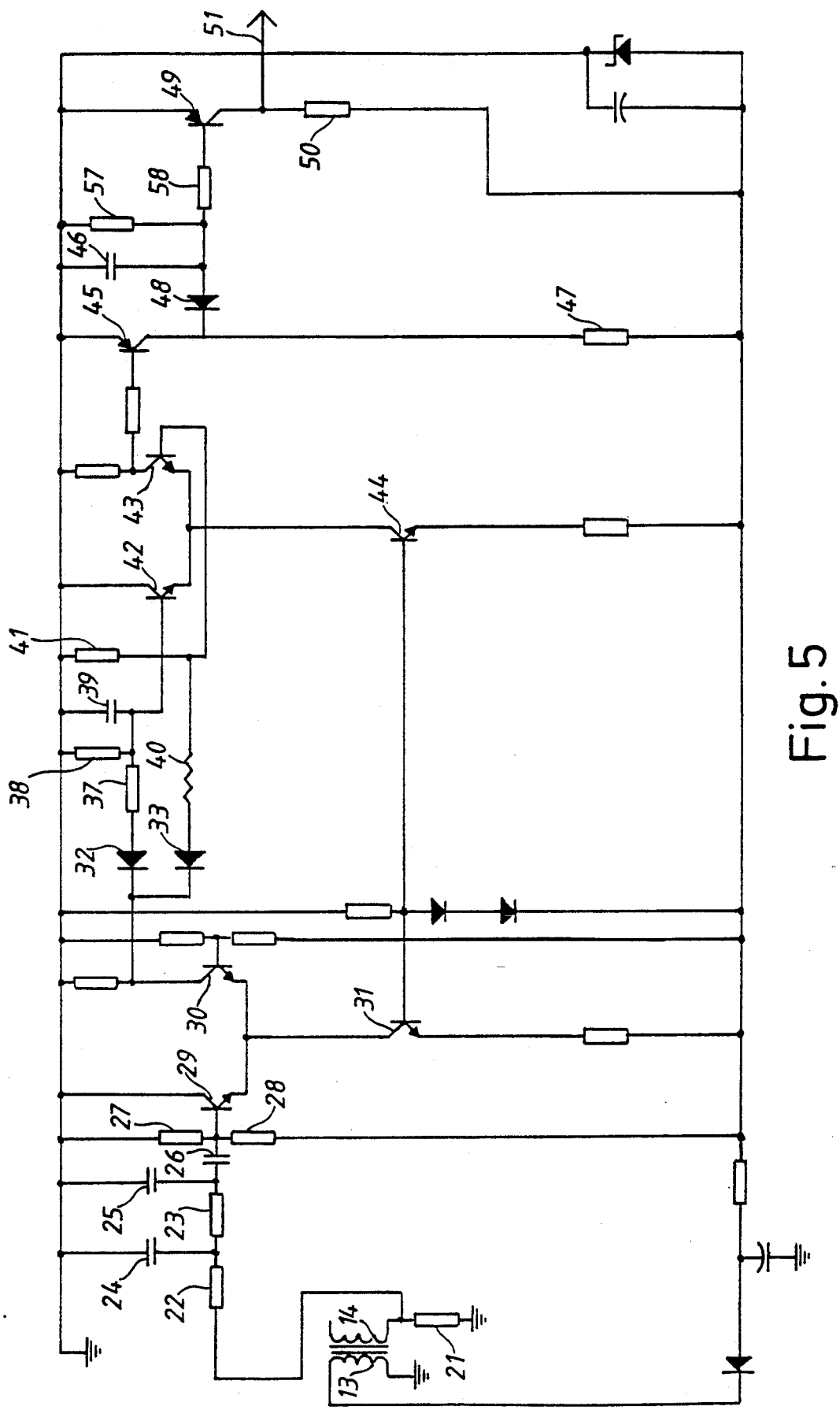

The invention is described in the following with reference to the accompanying drawings, in which FIG. 1 illustrates the general features of a magnetic ignition system, FIG. 2 is a sectional view of the carburetor of the engine, FIG. 3 is a diagram of the secondary current in the ignition coil during spark formation, FIG. 4 shows the derivative of the graph of FIG. 3, FIG. 5 is a wiring-diagram of a spark detector, FIG. 6 is a wiring-diagram of an ignition system with micro processor, and FIG. 7 is a diagram of the current of the primary winding of the ignition coil in short-circuit.

FIG. 1 shows a magnetic ignition system of an engine having a flywheel 10 with a permanent magnet inducing a voltage in an ignition coil 12 having primary and secondary windings 13, 14. The primary winding is connected to an electronic switch circuit 15 shown in more detail in FIG. 6.

The carburetor in FIG. 2 is a so-called membrane carburetor used in e.g. chain saw engines. A fuel chamber 16 is filled with fuel which is successively drawn in through a nozzle 17 having a needle 18 and extending to a through gas passage 19. The needle is an extension of a tapped shaft 20 which on the outside is connected to an adjusting motor 53 for adjusting the air-fuel mixture of the carburetor.

FIG. 3 is a diagram showing the current of the secondary side of the ignition coil when a spark is produced by the spark plug. A peak value of the current pulse can be assumed to be about 50 mA. FIG. 4 relates to the same time period as FIG. 3 and shows the first derivative of the secondary current according to FIG. 3. The graph is of a certain importance in the measuring procedure performed in the circuit according to FIG. 5.

The interest in the degree of divergence (ignition disturbances) is concentrated to the secondary side of the ignition coil 12 having the windings 13, 14. The latter, secondary winding is connected to ground via a resistor 21. The secondary current (FIG. 3) provides a voltage across this resistor and this voltage is conducted into s low-pass filter having resistors 22, 23 and condensors 24, 25. In the next step (condensor 26 and resistors 27, 28) the voltage is differentiated (FIG. 4) and amplified in a differential stage by transistors 29, 30, 31. In this stage variations of the feed voltage on the secondary side are suppressed, and the output signal is rectified in diodes 32, 33.

According to FIG. 3, the secondary current can vary from one spark to another, and a couple of different cases are shown by dashed graphs 34, 35. Corresponding graphs are shown in FIG. 4 in which is also shown an average peak value 36 produced by an RC circuit 37, 38, 39 connected to the diode 32 of the circuit. This value is a reference value of the derivative and is not constant but follows normal variations of speed of revolution and also variations of the size of the spark gap caused by electrode wear, etc. The rectified voltage produced by the diode 33 is supplied to a voltage divider having resistors 40, 41. The voltages produced by the components referred to are used in the following way:

The reference voltage 36 and the signal from the voltage divider 40, 41 are directed to a differential amplifier having transistors 42, 43, 44. As long as the spark is stable the reference voltage is higher than the voltage divided signal. The transistor 43 is thereby kept conductive and provides base current to a further transistor 45 which is thereby conductive.

When the spark is unstable it occurs that the signal from the voltage divider 40, 41 becomes higher than the reference voltage 36 whereby the conduction of transistors 43, 45 ceases. A condensor 46 is then charged by a resistor 47 via a diode 48. A control current is thereby directed to a transistor 49 which when conductive provides a voltage across a resistor 50 to the outlet 51 of the detector. A control means or the like responding to disturbances of the ignition is connected thereto. The reason may be lean or rich mixture, early or late ignition spark, or spark plug deficiency. The indication of interest in this connection is the one emanating from the adjustment of the carburetor at lean air-fuel mixture. A divergence in the course of the ignition is immediately indicated by the detector which thus provides an early information of the lean adjustment of the mixture. This information is important since it is preferable to set the adjustment very close to the point at which the divergence occurs. From this point the adjustment is set to a slightly richer mixture. The information is provided even when the engine is running under load, and the immediate consequence of a divergence will then be that the engine loses power and the speed is reduced.

FIG. 6 is a wiring-diagram of a micro processor ignition system also capable of controlling the air-fuel ratio via a drive stage 52 connected to an electric motor 53 for controlling e.g. the fuel needle of the membrane carburetor. The spark detector according to FIG. 5, which has the voltage supply in common with the rest of the electronics, is connected to a resistor 54 on the secondary side of the ignition coil and to a digital inlet of a micro processor 55.

FIG. 7 illustrates the current pulse generated in the primary winding of the ignition coil and used both as current supply for the electronics and as spark energy source. Point A of the graph is used as trigging point. This point is detected by a transistor 56 connected to the trigging inlet of the micro processor via a transistor 57, whereby a breaking procedure is generated in the processor at the peak of the graph. The procedure is described in more detail in Swedish patent 8302113-9 to which reference is made.

The detector described with reference to the diagram of FIG. 5 thus detects knocking and other irregularities of the combustion. However, the detector requires complementary electronics in order to process data and to actuate the point of ignition and/or the air-fuel ratio of the engine. In the simplest case the point of time of ignition can be delayed for example 3-5 degrees, and alternatively the air-fuel mixture is enriched about 5% when the detector indicates knocking as the engine is operating at a lean mixture ratio.

A better result can be obtained, however, if the frequency (intensity) of the combustion disturbances is taken into account. A single, temporary disturbance should not cause a change of the operation parameters. This can be achieved if the detector is connected to an ordinary control system, in this case generally comprising a micro processor controlling the ignition and fuel systems. The detector is then connected to a digital input connection of the micro processor which reads the status (high-low) at this connection a plurality of times per revolution of the engine. In order to prevent the micro processor from missing short disturbances the detector is provided with a pulse extender (48, 46, 57, 58, 44, 50) which extends even a short pulse from transistor 45 to a certain minimum time determined by means 46, 47.

Input data from the detector are processed in the micro processor. The intensity from the detector is measured by adding the number of detections during a certain period of time, normally 0.2-1 second. During this time 30-150 courses of combustion are detected in an engine of a Chain saw operating at 9000 rpm.

When the number of detections per unit of time exceeds a predetermined limit value of knocking intensity at lean operation, the point of ignition is delayed and/or the air-fuel mixture is slightly enriched. The adjustments are carried out by small steps. After every adjustment the knocking intensity is checked again and repeated adjustments are made until the engine is running in the normal way.

Preferable operational data of the latest adjustment at every speed of revolution of the engine kan be stored in the RAM memory of the micro processor, or alternatively in a so-called EEPROM memory in which the information is stored even when the engine is shut off.

I claim:

1. Method of controlling the point of ignition and/or air-fuel mixture of an i. c. engine by means of a signal circuit emitting a signal indicating abnormal combustion or disturbance, by using the first derivative of the spark current for detection, characterized in that the average peak value of the first derivative of the spark current is a reference value of the detection, and that the actual signal of the derivative of the spark current via a voltage divider is compared in a comparator circuit with said average peak value, whereby detection is obtained When the signal from the voltage divider exceeds said average peak value.

2. Method according to claim 1, characterized in that the spark current is measured across a resistor connected in series with the secondary winding of the ignition coil.

* * * * *